No. 768,404. PATENTED AUG. 23, 1904.
A. SCHÜTT.
PROCESS OF UTILIZING WASTE GASES.
APPLICATION FILED APR. 29, 1902.
NO MODEL.
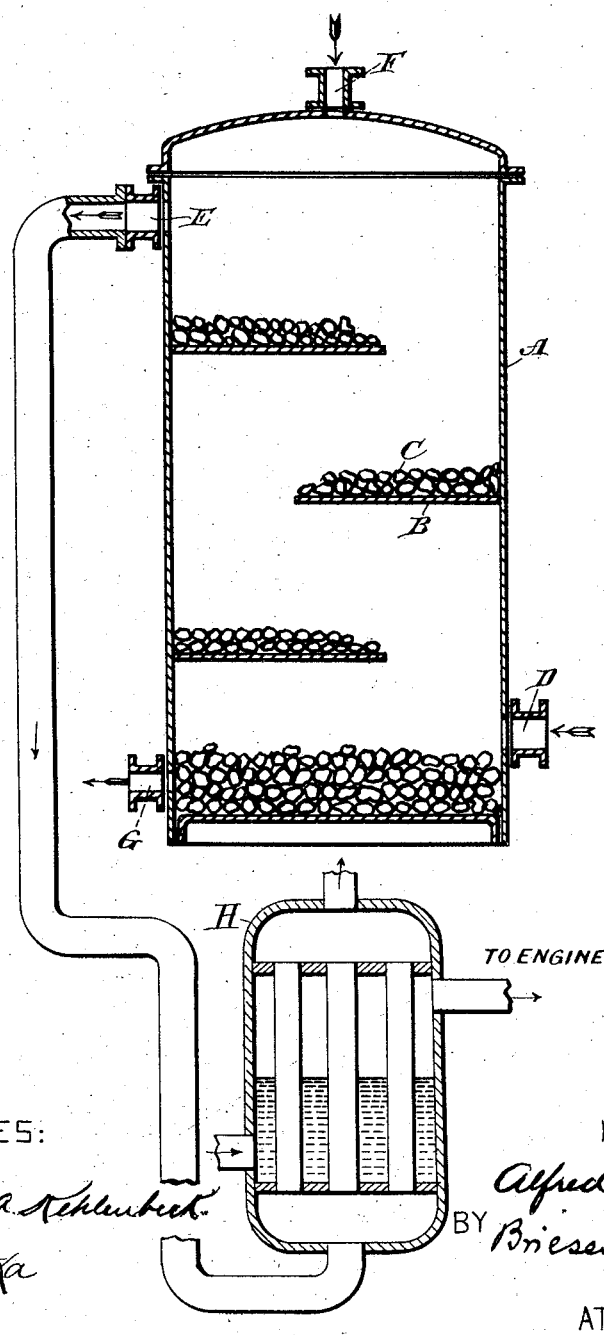

No. 768,404. Patented August 23, 1904.

UNITED STATES PATENT OFFICE.

ALFRED SCHÜTT, OF CHARLOTTENBURG, GERMANY.

PROCESS OF UTILIZING WASTE GASES.

SPECIFICATION forming part of Letters Patent No. 768,404, dated August 23, 1904.

Application filed April 29, 1902. Serial No. 105,611. (No specimens.)

*To all whom it may concern:*

Be it known that I, ALFRED SCHÜTT, mechanical engineer, a subject of the Emperor of Germany, and a resident of No. 19 Pestalozzi street, Charlottenburg, in the Kingdom of Prussia and Empire of Germany, have invented new and useful Improvements in Processes of Utilizing Waste Gases for Heating Liquids of Low Boiling-Point, of which the following is a specification.

The waste gases of boiler plants, cokeovens, blast and cupola furnaces, &c., and the escape-gases of gas and oil motors still contain much heat which may be advantageously utilized for heating liquids of low boiling-point—for instance, for working a heating plant with the high-pressure vapors of those liquids. When the evaporator for the cold steam liquid is to be heated directly by the waste gases, rather complicated and in some respects inconvenient constructions of vaporizers are required, because the waste gases are never pure, but contain admixtures capable of corroding the material of which the evaporator is made. The present method allows of the use of more simple constructions of a vaporizer, thereby insuring a more reliable working of the plant. For such purpose the waste gases are conveyed to an apparatus, where they give off their heat to water. This can be effected in two ways: First, the apparatus is in form of an ordinary low-pressure heating-boiler or economizer and the waste gases serve for evaporating the water, in which case the evaporator for the cold steam liquid is heated by the generated steam. Another method of carrying the process into effect consists in establishing on the way the waste gases take to the evaporator a chamber to where water is fed in suitable quantities, preferably on the counter-current principle, to the waste gases. This specific form of my invention is illustrated in the accompanying drawing, which is a sectional elevation of such interposed chamber or casing. Such chamber may, as shown, have the form of a coke-dome A, wherein water and gases are brought into very intimate contact with each other by allowing the water to spread over the inserted partitions B and any pieces of coke C which may be present, thus affording the waste gases the largest possible evaporating-surface. The waste gases coming from the "generator," under which term I include any apparatus from which gases are obtained, enter the casing or chamber A near the bottom at D and pass upwardly to the outlet E, located near the top. This outlet is connected with the vaporizer, in which the heat of the purified waste gases and of the steam which accompanies them is utilized for the vaporization of a liquid of low boiling-point. The water passes down over the pieces of coke or like material, and thus travels in a direction opposite to that of the gas-current, the water-inlet being indicated at F and the outlet at G. The surface of the water is very large as it spreads on the coke, and thus not only is the water caused to absorb a large amount of impurities from the gas, but at the same time a portion of the water is converted into steam, which, as is well known, has a high specific heat, and therefore a considerable heating power. The required quantity of water must be proportioned in such a manner that the greater part thereof evaporates, so that steam and the purified gases escape simultaneously and are fed to the evaporator H of the heating plant. The remaining unevaporated water serves for purifying the waste gases as far as possible from the impurities contained therein, so that the escaping gases no longer produce an injurious effect on the evaporator of the heating plant, and the former can be made of any suitable special construction. When working without vacuum, the waste gases are preferably cooled down to about 212° Fahrenheit, whereby they are completely deprived of the corresponding heat.

What I claim as my invention, and desire to secure by Letters Patent, is—

1. The herein-described process of utilizing hot waste gases which consists in bringing them into contact with water so that said water will absorb the impurities of the gases and will also be partly converted into steam, and then heating a liquid of low boiling-point with the mixture of purified gases and of steam thus obtained.

2. The herein-described process of utilizing hot waste gases, which consists in causing them to travel in contact with finely-divided water in a direction opposite to that in which the water moves, so as to heat said water to its boiling-point, the water being supplied in greater quantity than can be converted into steam by said gases, so that a portion of the water will remain unconverted and will absorb impurities from the gases, and then heating a liquid of low boiling-point with the mixture of purified gases and of steam thus obtained.

In testimony whereof I have hereunto signed my name, this 16th day of April, 1902, in the presence of two subscribing witnesses.

ALFRED SCHÜTT.

Witnesses:
 WOLDEMAR HAUPT,
 HENRY HASPER.